(12) United States Patent
Kitagata

(10) Patent No.: US 11,444,954 B2
(45) Date of Patent: Sep. 13, 2022

(54) AUTHENTICATION/AUTHORIZATION SERVER, CLIENT, SERVICE PROVIDING SYSTEM, ACCESS MANAGEMENT METHOD, AND MEDIUM

(71) Applicant: CANON KABUSHIKI KAISHA, Tokyo (JP)

(72) Inventor: Kei Kitagata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 16/845,406

(22) Filed: Apr. 10, 2020

(65) Prior Publication Data
US 2020/0336494 A1    Oct. 22, 2020

(30) Foreign Application Priority Data

Apr. 19, 2019 (JP) .............................. JP2019-080467

(51) Int. Cl.
*G06F 7/04* (2006.01)
*G06F 15/16* (2006.01)
*H04L 29/06* (2006.01)
*H04L 9/40* (2022.01)

(52) U.S. Cl.
CPC ................................. *H04L 63/108* (2013.01)

(58) Field of Classification Search
CPC .................. H04L 63/108; H04L 63/10; H04L 63/0807; H04L 63/083; H04L 63/0846; H04L 9/32; H04L 9/3213
USPC ............................................................. 726/9
See application file for complete search history.

(56) References Cited

U.S. PATENT DOCUMENTS

| 7,720,864 | B1* | 5/2010 | Muth | G06F 16/128 |
| | | | | 709/228 |
| 2015/0350179 | A1* | 12/2015 | Kobayashi | H04L 9/0861 |
| | | | | 726/4 |
| 2018/0278603 | A1* | 9/2018 | Yabe | H04L 63/10 |

FOREIGN PATENT DOCUMENTS

JP    2007-226470 A    9/2007

OTHER PUBLICATIONS

The OAuth 2.0 Authorization Framework, [online] D. Hardt, Aug. 2012 [URL http://tools.ietf.org/html/rfc6749].

(Continued)

*Primary Examiner* — Fatoumata Traore
*Assistant Examiner* — Samuel Ambaye
(74) *Attorney, Agent, or Firm* — Venable LLP

(57) ABSTRACT

An authentication/authorization server that manages access to a resource server is provided. The server comprises a management unit that manages an expected completion time of a change to an access destination authentication/authorization server with respect to a client for which the access destination authentication/authorization server is to be changed; an issuing unit that issues an access token for accessing the resource server, the token having an expiration time; and a response unit that returns the access token to the client, wherein if an expected completion time of the change to the access destination authentication/authorization server is managed with respect to the client that is the source of the token issuance request, the issuing unit sets the expiration time of the access token that has been issued to expire no later than the expected completion time of the change.

10 Claims, 6 Drawing Sheets

(56) References Cited

OTHER PUBLICATIONS

JSON Web Token (JWT), [online] M. Jones, J. Bradley, N. Sakimura, May 2015 [URL https://tools.ietf.org/html/rfc7519].
JSON Web Signature (JWS), [online] M. Jones, J. Bradley, N.Sakimura, May 2015 [URL https://tools.ietf.org/html/rfc7515].

* cited by examiner

AUTHENTICATION/AUTHORIZATION SERVER, CLIENT, SERVICE PROVIDING SYSTEM, ACCESS MANAGEMENT METHOD, AND MEDIUM

BACKGROUND OF THE INVENTION

Field of the Invention

The present invention relates to an authentication/authorization server, a client, a service providing system, an access management method, and a medium which use a signed access token.

Description of the Related Art

Recent years have seen an increase in the use of what are known as cloud-based services implemented over the Internet. Such cloud-based services publicize individual web service Application Program Interfaces (APIs), and it is now possible to use functions provided by such services from other applications, cloud-based services, and so on via the APIs. A standard protocol for linking authorizations, called "OAuth 2.0", is increasingly being employed for such web service APIs. Japanese Patent Laid-Open No. 2007-226470 discloses a technique that uses OAuth 2.0.

According to OAuth 2.0, when, for example, there is an API that acquires the data of a user managed by a service X, a client calling that API is granted access according to a range permitted by that user. The "client" may be a different service Y, a client application, or the like, for example. At this time, the range of information that will be accessed by the client is made clear, whereupon the service X obtains explicit authorization from the user for the client to access the API. The user carrying out this explicit authorization is referred to as an "authorization operation". The range being accessed is referred to in the OAuth 2.0 as a "scope", and the amount (or range) of data which is permitted to be accessed is determined by scopes.

When the user carries out the authorization operation, the client receives a token certifying that the range of data permitted by the user is allowed to be accessed in the service X (called an "access token" hereinafter), and the client can subsequently access the service X's API by using that access token. A client authorizing access to a user's resources through such an authorization operation carried out by the user is called "delegating". Note also that in OAuth 2.0, a server issuing an authentication token on the basis of a user's authorization operation is called an "authorization server". Finally, a server publicizing an API is called a "resource server", and the entity calling the API is called a "client".

With OAuth 2.0, the authorization server and the resource server can be configured in the same server device, the authorization server is normally a standalone server in large-scale systems such as where multiple types of resource servers are present. Applying the above-described flow to such a case, the service X requests the authorization server to verify the obtained access token each time the service Y is to use the API. Whether or not to permit the client to use the API is then determined on the basis of the verification result. In large-scale systems, this poses a problem in that a heavy load is placed on the authorization server. Accordingly, the use of a signed access token is being explored as a way for the service X to verify access tokens on its own, rather than requesting the authorization server to carry out the verification. The JSON Web Token (JWT) and JSON Web Signature (JWS) are known as types of signed access tokens. By verifying the signature of a received signed access token, the service X can determine whether the access token is valid without checking with the authorization server. A server having a function for authenticating users is called an "authentication server", and an authentication server which also has the functions of an authorization server is called an "authentication/authorization server".

With OAuth 2.0 clients, there are some situations where a single piece of client information is managed in a single terminal, and that client information is shared and used by multiple applications running on the terminal. An authentication/authorization server-linked client, which manages client information, the obtainment of access tokens from the authorization server, and the providing of access tokens for respective applications in a unified manner, is present in such a situation. An application running on the terminal obtains an access token by making a request to the authentication/authorization server-linked client, and then accesses the resource server.

Furthermore, with a cloud-based service, there are situations where services are operated using multiple data centers, e.g., which are located in different regions. In this case, resource servers provided in each of the data centers provide the service to the client. In such a situation, a user will be provided with the service from one of the data centers without being aware of where the data center providing the service is located.

One method for deploying a cloud-based service involves starting a new service in a specific region, and then building the service out to multiple regions. To give a more specific example, a resource server for providing a new service is installed in a specific data center when a service is started, for example. The capacity to provide the service is then strengthened by adding resource servers for providing the same service in other data centers. After the service is deployed throughout the multiple regions, it is more efficient for the client to access the resource server in a nearby region, in terms of communication costs and the like as well. However, changing the access destination to a nearby region means that tenant information, user information, and managed data originally being managed by the authentication/authorization server or the resource server in the region originally being accessed must be migrated to the authentication/authorization server or the resource server in the nearby region which is to be newly accessed.

Furthermore, a client obtains access destination information of the server along with the access token, and accesses the access destination server obtained along with the access token within the validity period of the access token. Thus even if the tenant information, client information, and managed data migration has been carried out on the client side, a client which has obtained the token before the migration will attempt to access the pre-migration server even after the migration has already been completed. The servers from before and after the migration therefore redundantly hold data for the same tenant, which means that if the pre-migration server can be accessed, the client may update the tenant and client information and the managed data in the pre-migration server. As a result, there is a problem in that the updates made by the client may not be reflected in the tenant, client information, and managed data in the migration destination server.

SUMMARY OF THE INVENTION

The present invention makes it possible to quickly migrate data pertaining to a client. The present invention furthermore prevents the occurrence of data problems such as inconsistencies and update errors arising during data migration.

The present invention has the following configuration. According to an aspect of the present invention, an authentication/authorization server that manages access to a resource server is provided, the server comprising: memory storing a program, and a processor that executes the program, and when executing the program, the processor causes the authentication/authorization server to function as: a management unit that manages an expected completion time of a change to an access destination authentication/authorization server with respect to a client for which the access destination authentication/authorization server is to be changed; an issuing unit that, in response to a token issuance request from a client, issues an access token for accessing the resource server, the token having an expiration time; and a response unit that returns the access token to the client, wherein if an expected completion time of the change to the access destination authentication/authorization server is being managed by the management unit with respect to the client that is the source of the token issuance request, the issuing unit sets the expiration time of the access token that has been issued to expire no later than the expected completion time of the change.

According to another aspect of the present invention, a service providing system comprising an authentication/authorization server and a client is provided, wherein the authentication/authorization server includes memory storing a first program, and a first processor that executes the first program, and when executing the first program, the first processor causes the authentication/authorization server to function as: a management unit that manages an expected completion time of a change to an access destination authentication/authorization server with respect to a client for which the access destination authentication/authorization server is to be changed; an issuing unit that, in response to a token issuance request from a client, issues an access token for accessing a resource server, the token having an expiration time; and a response unit that returns the access token to the client, wherein if an expected completion time of the change to the access destination authentication/authorization server is being managed by the management unit with respect to the client that is the source of the token issuance request, the issuing unit sets the expiration time of the access token that has been issued to expire no later than the expected completion time of the change; and wherein the client is a client including memory storing a second program and a second processor that executes the second program, and when executing the second program, the second processor causes the client to function as: a requesting unit that sends a request for an access token for accessing a resource server to the authentication/authorization server; a control unit that, when an address of an access destination authentication/authorization server received from the authentication/authorization server as a response to the request for the access token is different from an address of the authentication/authorization server to which the request for the access token was sent, carries out control so that the request for the access token is sent to the address of the access destination authentication/authorization server received from the authentication/authorization server; and a unit that accesses the resource server using the access token received from the authentication/authorization server.

According to the present invention, data pertaining to a client can be migrated quickly. Furthermore, the occurrence of data problems such as inconsistencies and update errors arising during data migration can be prevented.

Further features of the present invention will become apparent from the following description of exemplary embodiments with reference to the attached drawings.

DESCRIPTION OF THE EMBODIMENTS

Figure 1:
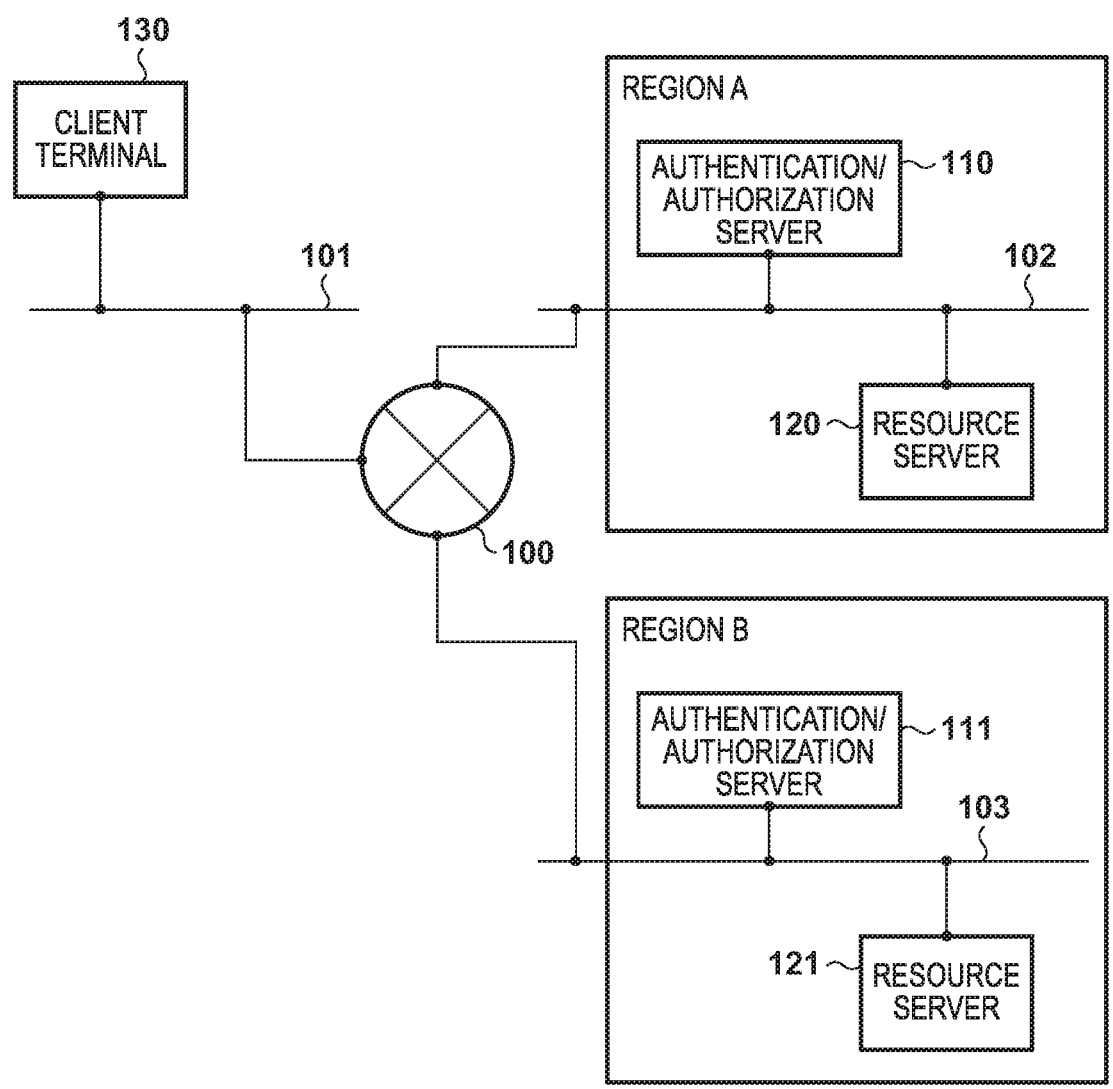
FIG. 1 is a diagram illustrating a system configuration.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

First Embodiment

A service providing system, and particularly an authentication/authorization server included in the system and an access management method, which serve as an embodiment of the present invention, will be described hereinafter with reference to the drawings. The present embodiment assumes that applications are installed in servers located on the Internet. The applications in the servers are linked to a client terminal, and provide a variety of functions. The entity providing such functions will be called a "service", and providing functions to a client terminal will be called "providing a service". An authentication/authorization system, which is an information processing system according to the present embodiment, is implemented on a network having a configuration such as that illustrated in FIG. 1.

System Configuration

A wide area network 100 may be any of a network such as the Internet, a telephone line, a dedicated digital line, a cable television line, a radio line for data broadcast, or the like, or may be a combination of these. LANs 101, 102, and 103 are local area networks that connect the respective constituent elements. In the present embodiment, a World Wide Web (WWW) system is constructed by these networks. In other words, the networks are TCP/IP networks, and each server/client has an HTTP server/client function. Clients access services using HTTP. Note, however, that the protocol which can be used as the basis for providing services is not limited to TCP/IP, and another protocol may be used instead.

An authentication/authorization server 110 is a server that provides a service for authentication and authorization, and controls access to a resource server 120. The resource server 120 provides a variety of services in accordance with applications, such as, for example, a service for backing up data in a client terminal, a service for analyzing sensor information from a client terminal, and so on. It is assumed that the authentication/authorization server 110 and the resource server 120 are servers located in the same data center. In other words, the authentication/authorization server 110 and the resource server 120 belong to the same region A.

An authentication/authorization server 111 is a different server from the authentication/authorization server 110, and controls access to a resource server 121. The resource server 121 provides a variety of services, such as, for example, a service for backing up data in a client terminal, a service for analyzing sensor information from a client terminal, and so on. It is assumed that the authentication/authorization server 111 and the resource server 121 are servers located in the same data center. In other words, the authentication/authorization server 111 and the resource server 121 belong to the same region B. It is furthermore assumed that the authentication/authorization server 110 and the authentication/authorization server 111 are located in different data centers, and that the resource server 120 and the resource server 121 are located in different data centers.

In this embodiment, one each of the authentication/authorization server 110 and the resource server 120 are installed in the same data center, and one each of the authentication/authorization server 111 and the resource server 121 are installed in the same data center; however, a plurality of the servers may be installed instead. A client terminal 130 is a device for using the services, such as a personal computer, a mobile terminal, an image forming device, or the like.

Device Configuration

Figure 2:
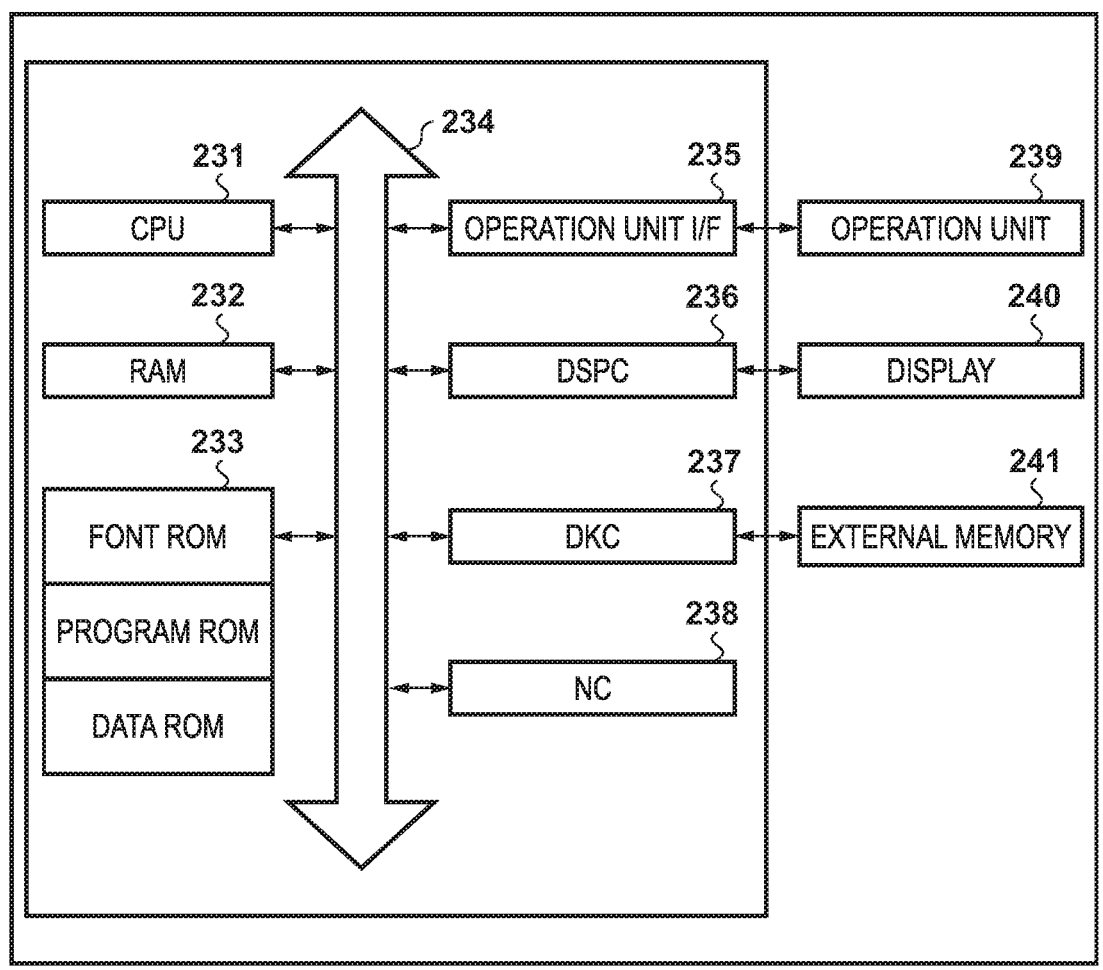
FIG. 2 is a diagram illustrating the hardware configurations of respective devices.

FIG. 2 illustrates the general hardware configurations of information processing apparatuses constituting the authentication/authorization servers 110 and 111, the resource servers 120 and 121, and the client terminal 130 according to the present embodiment. A CPU 231 executes programs, such as an OS or applications, that are stored in program ROM within ROM 233 or loaded into RAM 232 from external memory 241 such as a hard disk (HD). The CPU 231 also controls the respective blocks connected to a system bus 234. Here, "OS" is an acronym for "operating system", which runs on a computer, and the operating system will be referred to as an "OS" hereinafter. The processes of the sequences mentioned later are implemented by the CPU 231 executing these programs. The RAM 232 functions as main memory, a working area, and so on for the CPU 231. An operation unit I/F 235 controls inputs from an operation unit 239. A display controller (DSPC) 236 controls displays made by a display 240, which is an LCD or the like. A disk controller (DKC) 237 controls data access in the external memory 241, such as a hard disk (HD), that stores various types of data. A network controller (NC) 238 executes processing for controlling communication with a server computer, other devices, and so on connected over the Internet 100 or the LANs 101, 102, and 103.

Unless otherwise specified, all of the following descriptions assume that the CPU 231 is the main hardware entity, and that application programs installed in the external memory 241 are the main software entity. Note also that the server need not include the operation unit I/F 235, the operation unit 239, the DSPC 236, and the display 240.

Software Configurations and Managed Tables in Each Device

Figure 3:
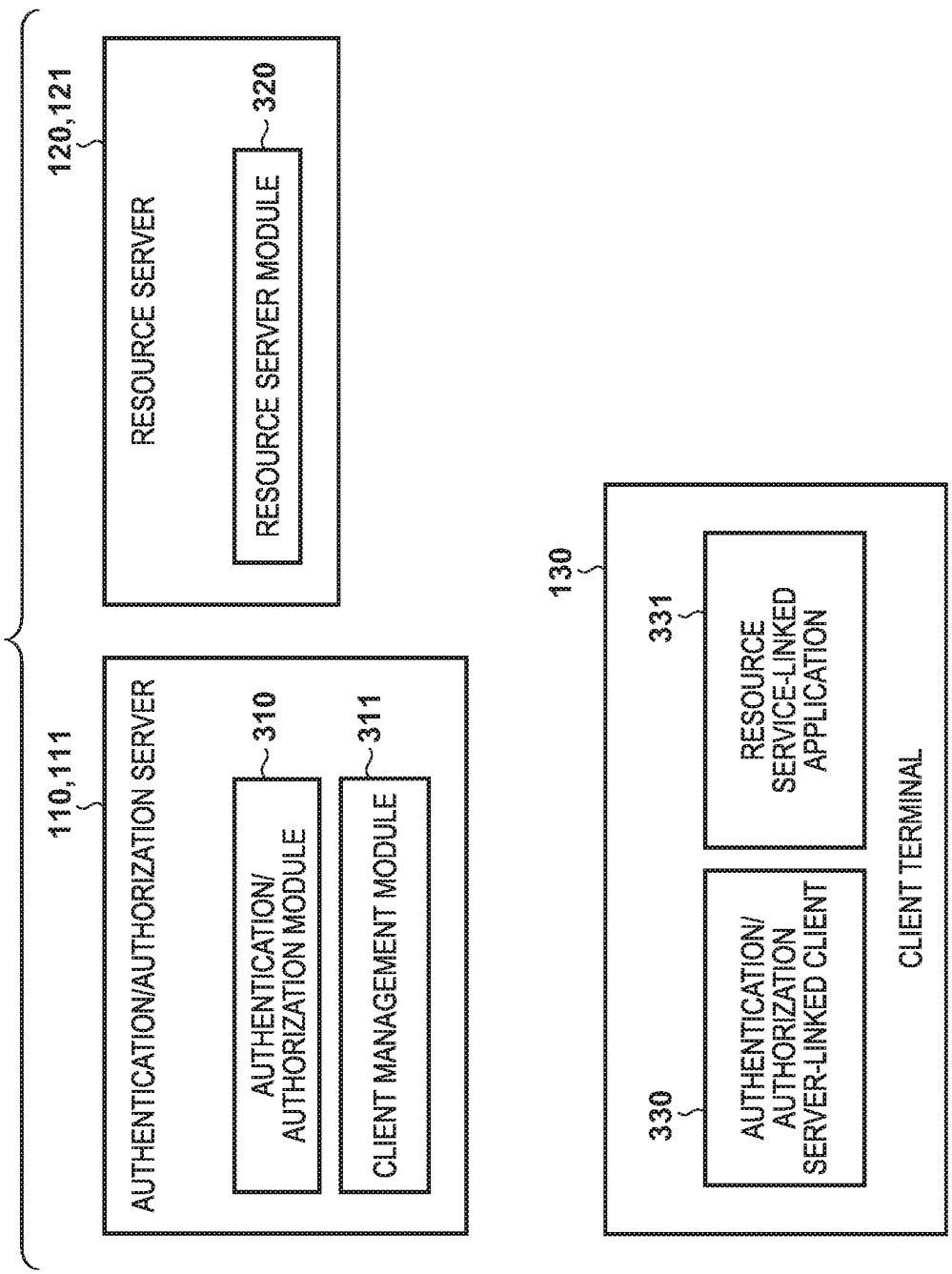
FIG. 3 is a diagram illustrating the software module configurations of respective devices.

FIG. 3 is a diagram illustrating module configurations in authentication/authorization servers 110 and 111, the resource servers 120 and 121, and the client terminal 130 according to the present embodiment. Various functions are implemented by the corresponding modules being executed. These modules are implemented and provided by the CPU 231 executing programs (software).

Each of the authentication/authorization servers 110 and 111 includes an authentication/authorization module 310. The authentication/authorization module 310 carries out a process for authenticating a user, a client terminal, and so on, a process for authorizing an authenticated user, client terminal, and so on, and a process for issuing a signed access token. A client management module 311 manages clients, and manages client IDs, secrets, and so on. "Management" includes storage, maintenance such as carrying out required updates and migrating data to other authentication/authorization servers, and so on.

Each of the resource servers 120 and 121 includes a resource server module 320. The resource server module 320 publicizes an API as a web service, and provides a service for accepting requests to provide the service made from the client terminal 130. The resource server module 320 also determines whether or not the service can be provided by carrying out a process for verifying a signed access token in response to a request from the client terminal 130.

The client terminal 130 includes an authentication/authorization server-linked client 330 and a resource service-linked application 331. The authentication/authorization server-linked client 330 makes requests for authenticating a user, a client, and so on, requests for access tokens to be issued, and the like to the authentication/authorization server 110, and obtains access tokens. The resource service-linked application 331 is an application that accepts the provision of services from the resource servers 120 and 121.

The resource service-linked application 331 accepts the provision of services from the resource servers 120 and 121 through the following procedure. First, the resource servers 120 and 121 make a request, to the authentication/authorization server-linked client 330, to issue an access token. Here, if the authentication/authorization server-linked client 330 has a usable access token, that access token is provided to the resource servers 120 and 121. If there is no usable access token, an access token for the resource service-linked application 331 is obtained from the authentication/authorization servers 110 and 111. The authentication/authorization server-linked client 330 provides the obtained access token to the resource service-linked application 331 from which the request came. Using the obtained access token, the resource service-linked application 331 can accept the provision of the service by making a resource request to the resource servers 120 and 121.

Here, the authentication/authorization servers 110 and 111 manage the information indicated in Table 1, namely, a client ID that uniquely identifies the client and a public key for authenticating the client, as well as a device serial and a tenant ID for uniquely identifying the client terminal 130 operated by the client. This table is called a server-use client management table. Note that the "client" referred to here is the authentication/authorization server-linked client 330. The authentication/authorization module 310 can authenticate the client terminal 130 on the basis of the client ID and the public key, and specify the device serial and the tenant ID of the client terminal 130. Note that "tenant" is a unit indicating a customer who will accept the provision of the service, and the individual users, clients, and so on who will actually access the resource server and accept the service belong to any one tenant. For example, a user in each tenant can use a service as if that use was exclusive, without regard for other tenants.

TABLE 1

Table 1: client management table (authentication/authorization servers 110 and 111)

| CLIENT ID | PUBLIC KEY | DEVICE SERIAL | TENANT ID |
|---|---|---|---|
| client 1 | publickey 1 | 123456789 | tenant A |
| client 2 | publickey 2 | 987654321 | tenant B |

According to Table 1, for example, client 1 uses publickey 1 as a public key; the serial number of the operating terminal is 123456789; and the tenant to which the client 1 belongs is tenant A.

As indicated in Table 2, the authentication/authorization server-linked client 330 of the client terminal 130 holds the client ID and a private key of the terminal itself as a client-use client management table.

TABLE 2

Table 2: client management table (client terminal 130)

| CLIENT ID | PRIVATE KEY |
|---|---|
| client 1 | privatekey 1 |

Although the present embodiment assumes authentication using the client ID and a symmetrical key (a private key), the authentication method, is, as described earlier, not particularly limited, and another method may be used, such as authenticating using the client ID and a secret. Methods for registering the client ID and the private key in the client terminal 130 include a method of dynamically registering the stated information when the client terminal 130 starts being used, or registering the information in advance. For example, when registering the information dynamically, secret information is stored in the client terminal 130, and the client ID and symmetrical key are generated dynamically when a request is made to the authentication/authorization servers 110 and 111 using the secret information. The client terminal 130 obtains the client ID and private key generated by the authentication/authorization servers 110 and 111 as a response, and manages that information in the client management table.

Likewise, as indicated in Table 3, the authentication/authorization servers 110 and 111 manage the client ID for uniquely identifying the client and a secret for authenticating the client, and the authentication/authorization module 310 authenticates the client terminal 130 on the basis of that information.

TABLE 3

Table 3: secret management table (authentication/authorization servers 110 and 111)

| CLIENT ID | SECRET |
|---|---|
| client A | secret A |
| client B | secret B |

Additionally, as indicated in Table 4, the authentication/authorization servers 110 and 111 hold connection destination information for each region in a management table. The connection destination information is a URL of the authentication/authorization servers 110 and 111, the resource servers 120 and 121, and so on for each region. The "connection destination" may be called an "address", for example. The connection destination is the destination to which the request for the access token is sent, in the case of an authentication/authorization server, and is the destination to which a service request is sent, in the case of a resource server.

TABLE 4

Table 4: connection destination management table (authentication/authorization servers 110 and 111)

| REGION | AUTHENTICATION/ AUTHORIZATION | RESOURCE SERVER URL |
|---|---|---|
| region A | https://auth.xxx.yyy/ | https://resource.xxx.yyy/ |
| region B | https://auth.aaa.ccc/ | https://resource.aaa.ccc/ |

Here, as indicated in the tenant management table shown in Table 5, the authentication/authorization servers 110 and 111 hold, as the tenant information, region information 1 of the data center which the client terminal 130 is currently accessing, region information 2 of the data center which will be accessed after migration (i.e., after the movement or the change), and an expected migration completion time (also called an "expected completion time"). Here, the "data center being accessed" refers to the data center in which the server being accessed is installed, and the "region information" of the data center can therefore also be called region information of the server. "Migration" refers to moving the tenant information and user information managed by the authentication/authorization server 110 or the resource server 120 to another authentication/authorization server or resource server. The "other authentication/authorization server or resource server" may be the authentication/authorization server 111 or the resource server 121 of a region nearby the client, for example. With a tenant for which migration has become necessary, the authentication/authorization servers 110 and 111 manage the expected migration completion time as indicated in Table 5 by an administrator registering the connection destination management table in advance (i.e., before the migration).

When migration is expected to take place, that is, when expected migration completion times are set in Table 5, values for the region information 1, which indicates the pre-migration region, and the region information 2, which indicates the migration destination region, are set with respect to tenant A and tenant C in Table 5. Once the migration is complete, the authentication/authorization servers 110 and 111 set, in the region information 1, the migration destination region ID which had been registered in the region information 2, and delete the values set in the region information 2 and the expected migration completion time, as indicated by the setting example for tenant B in Table 5. This state is a state in which there is no plan to migrate for the tenant.

The tenant management table in Table 5 can also be called a table that manages an expected completion time of a change, the server before the change, and the server after the change, for a tenant (including the client) for which the access destination authentication/authorization server will be changed. Although the same tenant management table in Table 5 may be held by the authentication/authorization server in each region, it is also acceptable for only the authentication/authorization servers installed in the data centers belonging to the regions indicated by the region information 1 and the region information 2 to hold the table. In the latter case, for example, the authentication/authorization server belonging to region A may hold a tenant management table pertaining to tenant A, whereas the authentication/authorization server belonging to region B may hold a tenant management table pertaining to tenant B and tenant C. In the former case, it is necessary for the tenant management table to be synchronized among all of the authentication/authorization servers. In the latter case, if a plan for migration has been registered, it is necessary to update the tenant management table in the authentication/authorization server belonging to the migration destination region, and share the related parts in the tenant management table with the authentication/authorization server belonging to the pre-migration region.

The connection destination management table is a table for managing the locations of the authentication/authorization server and resource server set as the user's current access destination, and the expected migration completion period, and is furthermore a table for managing the locations of the authentication/authorization server and the resource server set as the access destinations for the user after the migration. Note that the expected time is not limited to a time, and may include information for specifying a timing, such as a date.

TABLE 5

Table 5: tenant management table (authentication/authorization servers 110 and 111)

| TENANT ID | REGION | REGION | EXPECTED MIGRATION |
|---|---|---|---|
| tenant A | region A | region B | YYYY/MM/DD hh:mm (UTC) |
| tenant B | region B | — | — |
| tenant C | region B | region C | YYYY/MM/DD hh:mm (UTC) |

In the present embodiment, the information is managed in units of tenants, and thus the various types of tables, such as Table 5, are registered on a tenant-by-tenant basis. For example, if the information is managed on a user-by-user basis, a user ID is registered instead of a tenant ID. Furthermore, the tenant is the unit for managing users, and thus a "tenant" can also be called a "user".

Signed Access Token

The signed access token according to the present embodiment will be described next. In the present embodiment, a JWS (called a "JWS access token" hereinafter), which holds access token information and user information associated with the access token, serving as resource owner information, is used instead of a normal access token.

The JWS access token, which is an example of the signed access token used in the present embodiment, will be described hereinafter. JWS (JSON Web Signature) is a means for expressing JWT (JSON Web Token) content protected by a digital signature, MACs (Message Authentication Codes), or the like. JWT is also a method for expressing URL-safe claims using a data structure based on JSON (JavaScript (registered trademark) Object Notation). JWS and JWT have been standardized and publicized in RFC (RFC 7515 (JWS) and RFC 7519 (JWT), respectively). The claims included in the JWS access token used in the present embodiment are as follows.

TABLE 6

Table 6: claims included in the JWS access token

| | CLAIM NAME | CLAIM NAME | CLAIM DETAILS |
|---|---|---|---|
| 1 | Registered Claim | "iss" (Issuer) | An identifier of the JWT issuer |
| 2 | | "sub" (Subject) | An identifier of the principal that |
| 3 | | "aud" (Audience) | A list of identifiers of principals |
| 4 | | "exp" (Expiration Time) | The expiration time of the JWT |
| 5 | | "nbr (Not Before) | The date on which the JWT |
| 6 | | "iat" (Issued At) | The time at which the JWT was |
| 7 | | "jti" (JWT ID) | A unique identifier for the JWT |
| 8 | Private Claim | "authz: scopes" | An authentication token scope list |
| 9 | | "authz: client_id" | An authentication token client ID |
| 10 | | "ext: fname" | A first name |
| 11 | | "ext: lname" | A last name |
| 12 | | "ext: email" | An email address |
| 13 | | "ext:tenantid" | A tenant ID |

The claims in the claim name class "Registered Claim" in Table 6 are claims defined in JWT RFC 7519, and are as follows. "iss" (Issuer) is an identifier of the issuer of the JWT; "sub" (Subject) is an identifier of the principal serving as the subject of the JWT; "aud" (Audience) is an identifier list of the principals who are anticipated to use the JWT; "exp" (Expiration Time) is the expiration time of the JWT; "nbf" (Not Before) is a date/time when the JWT becomes valid; and "iat" (Issued At) is the time at which the JWT was issued; and "jti" (JWT ID) is a unique identifier for the JWT. "nbf" indicates the starting period of the expiration time. The date/times designated in the aforementioned "exp", "nbf", and "iat" are JSON numerical values expressing UTC dates and times, up to seconds, designated from 1970-01-01T0:0:0Z UTC according to IntDate. These "Registered Claims" can be used as desired.

In the present embodiment, the authentication/authorization server 110 issuing the JWS access token sets the following values. A URI of the authentication/authorization server 110 is set as "iss", a Universally Unique Identifier (UUID) of the user is set as "sub", and a URI of the resource server 120 is set as "aud". 3,600 seconds from the time the JWT is issued is set as "exp", i.e., the value of "iat"+3,600; and the time when the JWT was issued, i.e., the same value as "iat", is set as "nbf". The authentication token ID in the access token information is set as "jti".

Furthermore, the claims in the claim name class "Private Claim" in Table 6 are the private claim name class used under an agreement between the JWT issuer and user, according to JWT RFC 7519. This assumes that there is no conflict with other defined claim names. The present embodiment has a feature in that the claim name in the "Private Claim" class includes authentication token information (the authentication token scope list "authz:scopes" and the authentication token client ID "authz:client_id"), and attribute information associated with the authentication token (the first name "ext:fname", the last name "ext: lname", the tenant ID "ext:tenantid", the email address "ext:email", the device serial "ext:device-serial", and the application ID "ext:appid").

Specifically, in the present embodiment, the authentication/authorization server 110 issuing the JWS access token sets the claims "authz:scopes" and "authz:client_id" as authorization information. In other words, a scope list expressing the resources permitted by the resource server 120 to be obtained is set as "authz:scopes". Furthermore, the "authz:client_id" expressing the ID of the client which will access the resource server 120 is set as the "authz:clientid".

Additionally, the authentication/authorization server 110 which issues the JWS access token sets the claims expressing the information of the user having the UUID set in "sub" as the attribute information associated with the token indicated by "authz:tokened". The first name is set as "ext: fname", the last name is set as "ext:lname", the tenant ID to which the user belongs is set as "ext:tenantid", and the email address is set as "ext:email". Furthermore, a device serial number identifying the client terminal 130 is set as "ext: dev-serial", and an application ID for identifying the resource service-linked application 331 is set as "ext: appid".

The authentication/authorization server 110 which issues the JWS access token having details such as those indicated in Table 6 according to the present embodiment encodes the claims in Table 6 as JSON according to RFC 7519, which is the JWT specification. In addition, the content digitally signed in accordance with the compact serialization specification of RFC 7515, which is the JWS specification (the JSON expression of the claims in Table 6, i.e., the JWS payload), is encoded as a compact URL-safe character string. The JWS access token according to the present embodiment is a character string in which the encoded JWS header, the encoded JWS payload, and the encoded JWS signature are connected in that order using a period (.) as a delimiter, according to the JWS compact serialization specification.

In the present embodiment, "alg" (algorithm) is used to identify the encryption algorithm used for the JWS signature serving as a JWS header. Specifically, in the present embodiment, "R5256" (RSASSA-PKCS1_v1_5 using SHA-256) is used as "alg". The "R5256" character string is registered in the IANA JSON Web Signature and Encryption Algorithms registry as the value of "alg", and is defined in Section 3.1 of the JSON Web Algorithms (JWA) specification (RFC 7518).

Note that in the present embodiment, the key pair, including the private key and the public key, used with the encryption algorithm "R5256" employed for the JWS signature, is a pair generated in advance by the authentication/ authorization servers 110 and 111. The public key for verifying the JWS signature is provided in advance in the resource servers 120 and 121 which use the JWS access token. Although belonging to a different security domain from the authentication/authorization server 110, the resource server 121 holds the public key for verifying the JWS access token. Accordingly, the resource server 121 holding the public key which verifies the JWS access token issued by the authentication/authorization server 110 can be used with that JWS access token.

Figure 4:
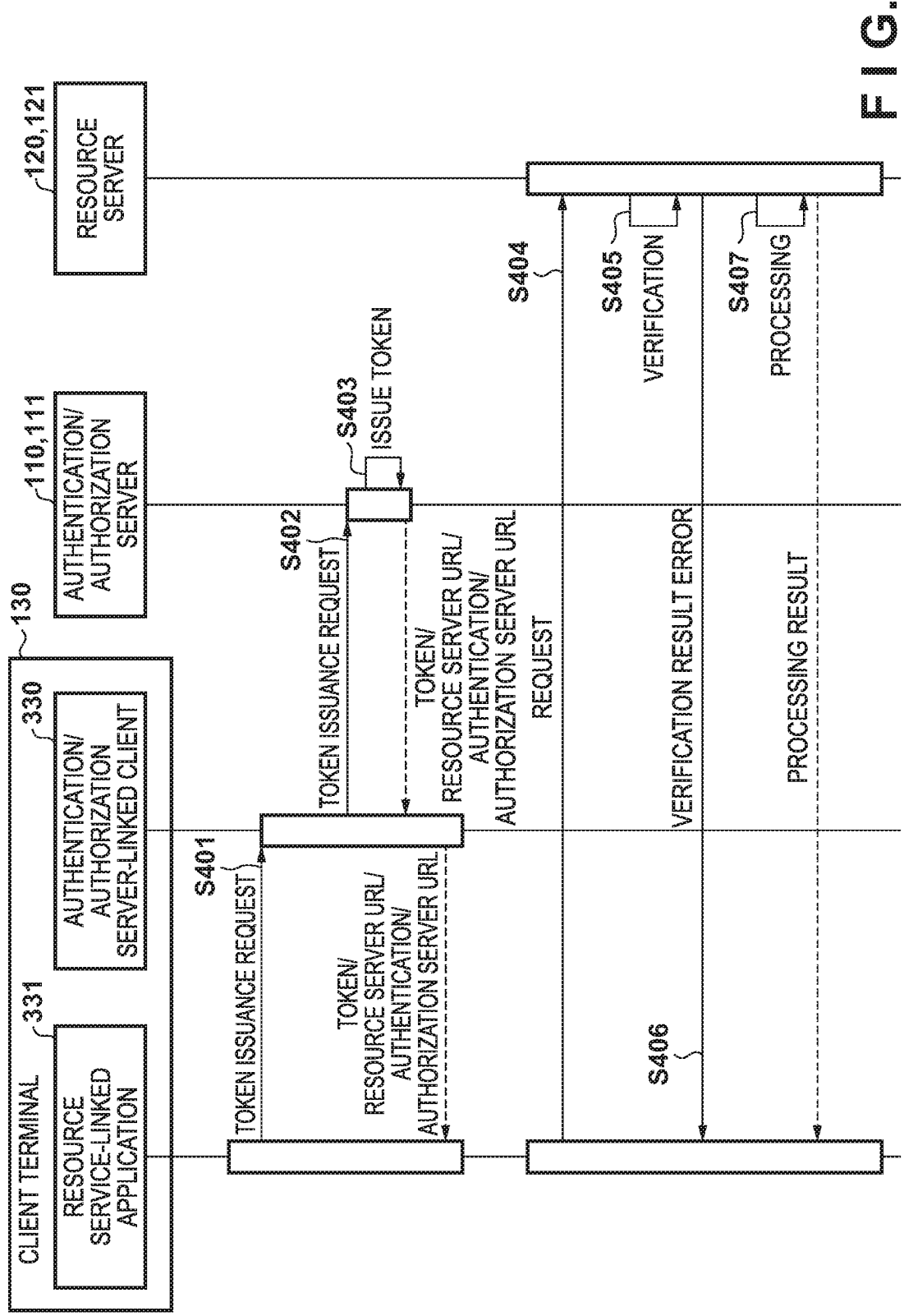
FIG. 4 is a sequence chart illustrating a process through which a client terminal accesses a resource server.

The flow of processing in which the access destination is changed from the resource server 120 pre-migration to the resource server 121 serving as the migration destination, after the data migration of the client terminal 130, will be described with reference to FIGS. 4 to 6. FIG. 4 illustrates the flow of normal processing through which the client terminal 130 accesses the resource servers 120 and 121. Although the access destination server may be in either of the region A and the region B in FIG. 4, it is assumed that the resource server and the authentication/authorization server for accessing that resource server are located in the same region.

In step S401, the resource service-linked application 331 of the client terminal 130 requests that the authentication/ authorization server-linked client 330 to issue a token. In response to the request, the authentication/authorization server-linked client 330 creates an assertion using the client ID and the private key of that client managed in the client management table indicated in Table 2, and generates a token issuance request along with the assertion.

In step S402, the authentication/authorization server-linked client 330 sends the assertion to the authentication/ authorization servers 110 and 111, and makes the token issuance request. In step S403, having received the token issuance request from the authentication/authorization server-linked client 330, the authentication/authorization servers 110 and 111 obtain the public key of the client from which the token issuance request originated, and verify the signature of the assertion. If the verification succeeds, a signed access token is issued as a response. At this time, the authentication/authorization servers 110 and 111 respond with the resource server URL and the authentication/authorization server URL accessed by the client from which the request originated, along with the token.

Accordingly, in step S403, the authentication/authorization servers 110 and 111 refer to the tenant management table in Table 5 for the tenant ID of the tenant to which the client ID in the client management table in Table 2 belongs. The inclusion relationship between the tenant and the client/ user may be managed by an authentication/authorization server using a different table, for example. Then, the region information 1 of the current client corresponding to the referenced tenant ID, which is registered in the tenant management table in Table 5, is read. The resource server URL and the authentication/authorization server URL associated with the region indicated by the region information 1 are then obtained from the connection destination management table in Table 4. The server URLs which are obtained are then returned as a response along with the issued token. Note that the tables indicated by Table 1 to Table 5 may be consolidated as a single database, which simplifies the above-described procedure for referring to the tables.

Having received the response, the authentication/authorization server-linked client 330 of the client terminal 130 returns the token, the resource server URL, and the authentication/authorization server URL to the resource service-linked application 331 as a response to the request received in step S401. This token is verified by one of the resource servers 120 and 121 to which access is being controlled by the authentication/authorization servers 110 and 111. The resource server URL and the authentication/authorization server URL are for accessing one of the resource servers 120 and 121.

The resource service-linked application 331 sends a service request to the resource servers 120 and 121 indicated by the resource server URL using the token (i.e., along with the token). In step S405, the resource servers 120 and 121 verify the received token. The resource servers 120 and 121 hold the public key for verifying the token issued by the authentication/authorization servers 110 and 111, and authorize the client by verifying the token. In the token verification, whether the token signature is valid is verified using the public key, and is furthermore verified whether the token is still within its validity period. At this time, if the validity of the token cannot be determined through either form of verification, a verification result error is returned to the resource service-linked application 331 in step S406. Additionally, the resource servers 120 and 121 can obtain the client information as a result of verifying the token, and the client terminal 130 which is accessing the servers can be identified using the device serial. In step S407, the resource servers 120 and 121 that received the request carry out processing in response to the received request.

Migration Process

Figure 5:
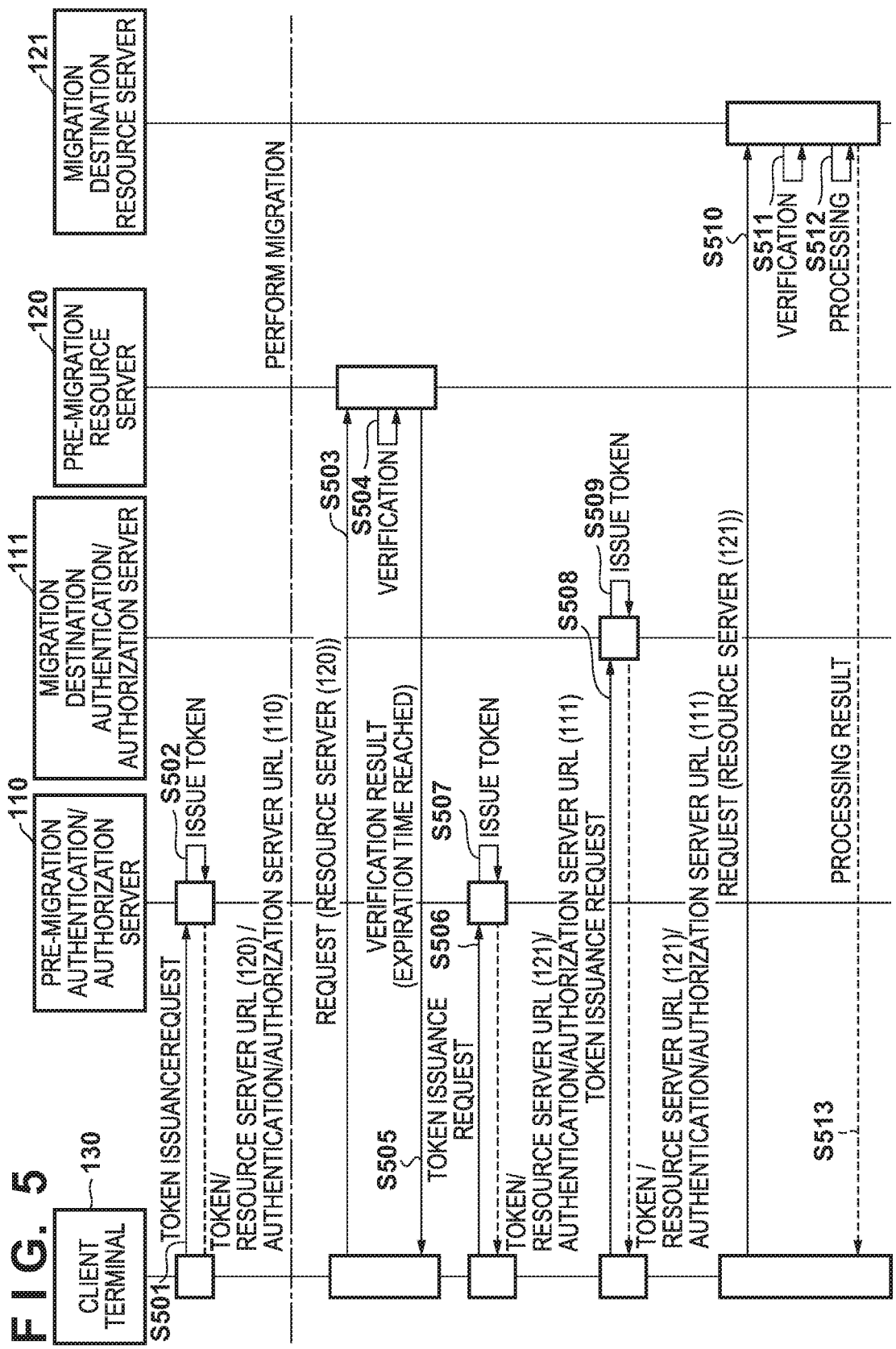
FIG. 5 is a sequence chart illustrating a process through which a client terminal accesses a migration destination resource server.

FIG. 5 illustrates the flow of processing in which the client terminal 130 changes its access destination from the pre-migration resource server 120 to the resource server 121 serving as the migration destination. In the present embodiment, the authentication/authorization server 110 and the resource server 120 are defined as the pre-migration servers from before the data migration is carried out, and the authentication/authorization server 111 and the resource server 121 are defined as the migration destination servers after the migration is carried out. In other words, it can also be said that the data pertaining to the tenant to which the client terminal 130 belongs is migrated from region A to region B.

In step S501, the client terminal 130 makes a token issuance request to the authentication/authorization server 110. In step S502, the authentication/authorization server 110 obtains the public key of the client that made the token issuance request, verifies the signature of the assertion, and issues a token to the client terminal 130 as a response. At this time, the pre-migration resource server URL and the pre-migration authentication/authorization server URL from the information in Table 4 and Table 5 are returned along with the token in the response. Here, if a value is set for the expected migration completion time in the tenant management table in Table 5, the region of the region information 1 in Table 5 is the region of the resource server URL and the authentication/authorization server URL in the connection destination management table in Table 4. Additionally, at this time, the expiration time for the token is set to expire at the expected migration completion time. The flow for setting the "nbf" value (the expiration time) in the access token in Table 6 will be described later with reference to FIG. 6.

In step S503, the client terminal 130 sends a request to the pre-migration resource server 120 indicated by the resource server URL. In step S504, the pre-migration resource server 120 verifies the received token. In the token verification, the pre-migration resource server 120 verifies whether the "nbf" value in Table 6 is within the validity period, and that the values outside the validity period, a verification result error is returned as a response in step S505. The expiration time of the access token issued before switching to the migration destination resource server 121 in the data migration is set to expire, at the latest, at the timing at which the data migration is complete. Accordingly, as indicated in FIG. 5, the access token issued before the migration is past the expiration time in step S505 after the migration, and thus a verification result error is returned as a response.

In step S506, the client terminal 130 makes a token issuance request to the pre-migration authentication/authorization server 110 indicated by the obtained authentication/authorization server URL. In step S507, the authentication/authorization server 110 issues a token to the client terminal 130 as a response. At this time, the migration destination resource server URL and the migration destination authentication/authorization server URL associated with the post-migration region information 1, in the information from the connection destination management table in Table 4 and the tenant management table in Table 5, are returned along with the token in the response.

In step S508, the client terminal 130 makes a token issuance request to the migration destination authentication/authorization server 111 indicated by the obtained authentication/authorization server URL. In step S509, the authentication/authorization server 111 issues a token to the client terminal 130 as a response. Here, if migration has been carried out, the client terminal 130 makes the token issuance request again in step S508 after step S506. The determination as to whether or not to repeat the token issuance request may be made, for example, by comparing the authentication/authorization server URL received as a response to step S506 with the authentication/authorization server URL held at that point in time. If it is determined that the two URLs are different as a result of the comparison, in step S508, the access token request is made to the new authentication/authorization server URL. However, if the URLs are the same, the request may be sent, as in step S503, to the resource server URL obtained at the same time as the access token, using the obtained access token.

In step S510, the client terminal 130 sends a request to the migration destination resource server 121 indicated by the migration destination resource server URL. In step S511, the migration destination resource server 121 verifies the received token. If the validity of the token has been confirmed as a result of the verification, in step S512, the migration destination resource server 121 carries out processing in response to the request. In step S513, the migration destination resource server 121 returns a result of the processing to the client terminal 130 as a response.

As a result of the foregoing procedure, the client can know the access destination for the server after migration, and can access that server, without delay.

Setting Expiration Time (or Validity Period)

Figure 6:
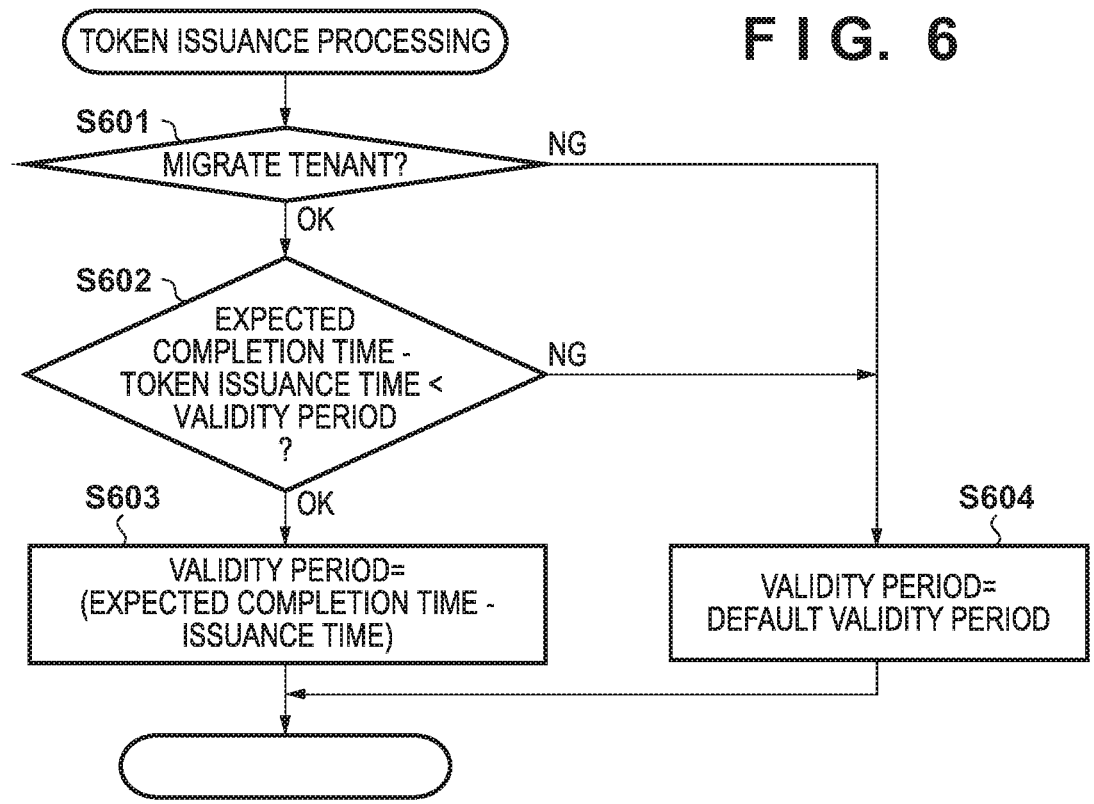
FIG. 6 is a flowchart illustrating a process for setting a token validity expiration time.

FIG. 6 illustrates the flow of a process through which the authentication/authorization servers 110 and 111 set the value of the expiration time of the token in the client terminal 130 of the tenant for which migration is planned. This process is executed by the CPU of the authentication/authorization server. Upon receiving the token issuance request from the client terminal 130, the authentication/authorization servers 110 and 111 first issue an access token using the already-set value as the expiration time. The process of FIG. 6 is started after that.

In step S601, the authentication/authorization servers 110 and 111 determine whether the source of the access token request is the client of the tenant subject to the migration, on the basis of whether or not the expected migration completion time is present in the tenant management table of Table 5. If the tenant is subject migration, in step S602, the magnitude of the expiration time value, which is the "exp" value in Table 6, is compared with a value obtained by subtracting the token issuance time, which is the "iat" value of the access token in Table 6, from the expected migration completion time in the tenant management table in Table 5. If the expiration time value is higher, in step S603, the expiration time value of the created token is reset to a value obtained by subtracting the current time from the expected migration completion time. If the expiration time value is lower, in step S604, a default expiration time value is set as-is.

Note that it is assumed that the expected migration completion time is set so that an interval between the expected migration completion time and the set time is longer than the maximum validity period of the access token. This is done in order to prevent migration from being carried out before the expiration time of the access token after the access token has been issued in a state where the expected migration completion time has not been set.

As a result, when there is a plan to carry out migration, the expiration time of the token is reached when the migration is complete. As such, even if the client terminal is a terminal which caches tokens, a request to reissue the token is by necessity made to the authentication/authorization server, which makes it possible for the client to obtain the migration destination server URL. All the clients then access the migration destination server after the migration, and thus no inconsistencies, discrepancies, and so on arise in the data between the pre-migration and migration destination servers.

In the foregoing descriptions, the determination as to whether or not to repeat the token issuance request in step S508 after step S506 may be made, for example, by comparing the authentication/authorization server URL received as a response to step S506 with the authentication/authorization server URL held at that point in time. However, the configuration may be such that the authentication/authorization server that received the token issuance request compares its own URL with the authentication/authorization server URL obtained from the tenant management table in Table 5 and the connection destination management table in Table 4 on the basis of the client ID, and then does not return the authentication/authorization server URL if the stated URLs are the same. In this case, if the client that received the access token has also received an authentication/authorization server URL along with the access token, that client may once again request an access token from that URL; whereas if the client has not received such a URL, the client may make a request to the resource server.

Second Embodiment

A second embodiment will describe means for preventing data inconsistencies or update errors between the pre-migration server and the migration destination server even in a situation where the pre-migration resource server has received an update request during data migration. In the present embodiment, the procedure illustrated in FIG. 7 is executed instead of that illustrated in FIG. 6.

Figure 7:
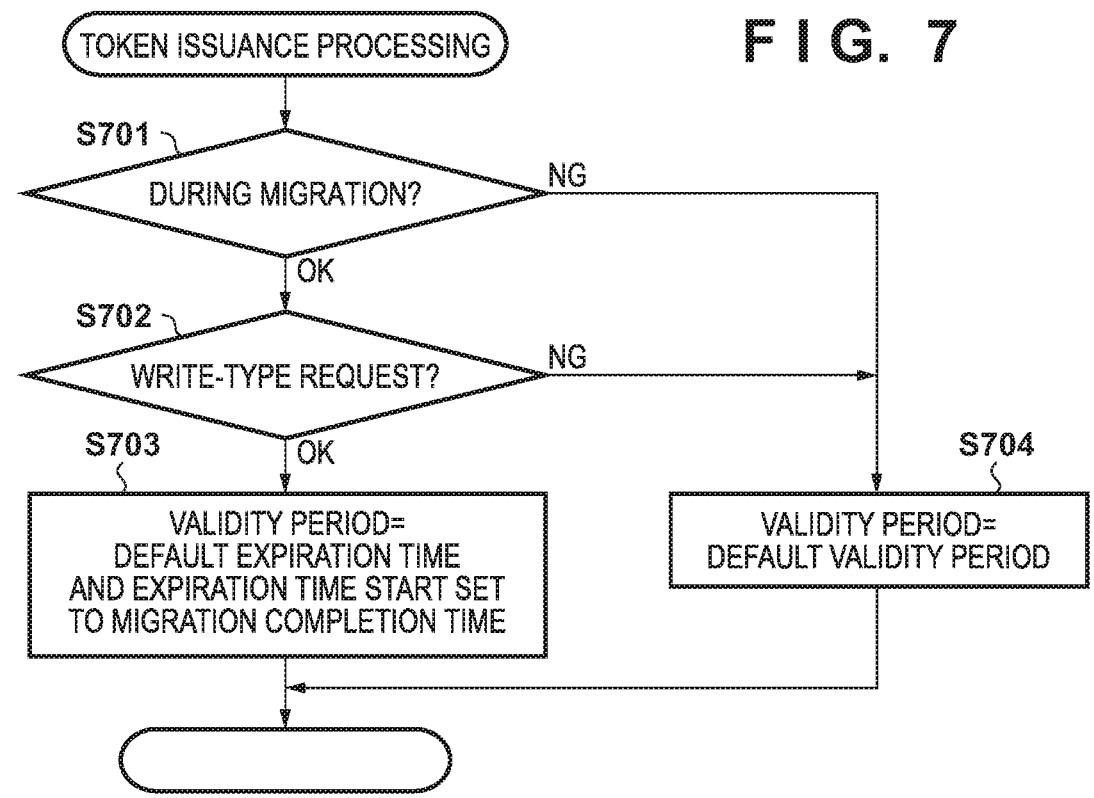
FIG. 7 is a flowchart illustrating a process for setting a token validity expiration time in accordance with a request type.

FIG. 7 illustrates the flow of a process through which the authentication/authorization servers 110 and 111 set the value of the expiration time of the token in the client terminal 130 of the tenant for which migration is planned. When the authentication/authorization servers 110 and 111 receive a token issuance request from the client terminal 130, in step S701, the authentication/authorization servers 110 and 111 determine whether the client is the client of the tenant subject to the migration, on the basis of whether or not the expected migration completion time is present in the tenant management table of Table 5. If the tenant is subject to migration, in step S702, it is determined whether or not the request to the resource server is a request to update a resource, i.e., a write-type request. A "write-type request" is a request made using POST, PUT, or DELETE in the Hypertext Transfer Protocol (HTTP) method.

If it is determined that the request is a read-type request, in step S704, the default expiration time value is set. If it has been determined in step S702 that the request is a write-type request, in step S703, the default expiration time value is set, and the time at which the token becomes valid, i.e., the "nbr value of" the access token in Table 6, is set as the expected migration completion time. Note that the default value of "nbf" may be the same as the time of issuance. Furthermore, the expected migration completion time, the migration destination authentication/authorization server URL, and the migration destination resource server URL are returned to the client terminal 130 along with the token as a response. If the expected migration completion time has been received along with the access token, the client terminal 130 does not use that token until the expected migration completion time. Additionally, by providing the migration destination resource server URL at the same time, it is possible to reduce the number of requests from the client terminal for reobtaining the URL. Note that the sending and receiving of the expected migration completion time may be omitted, and the issued token may be used normally. In this case, a response indicating that the received access token cannot yet be used is made from the resource server, and thus if such response has been received, the access may be retried after standing by for a predetermined amount of time.

As described above, by switching to a token that will be valid after the migration completion time, the access destination of the client terminal after the completion of the migration can be switched to the migration destination resource server. As a result, all the clients then access the migration destination server after the migration, and thus no inconsistencies arise in the data between the pre-migration and migration destination servers.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-080467, filed Apr. 19, 2019 which is hereby incorporated by reference herein in its entirety.

What is claimed is:

1. An authentication/authorization server that manages access to a resource server, comprising:
   memory storing a program, and a processor that executes the program, and when executing the program, the processor causes the authentication/authorization server to perform:
   managing an expected completion time of a change to an access destination authentication/authorization server with respect to a client for which the access destination authentication/authorization server is to be changed;

issuing, in response to a token issuance request from a client, an access token for accessing the resource server, the token having an expiration time; and returning the access token to the client, wherein if an expected completion time of the change to the access destination authentication/authorization server is being managed the managing with respect to the client that is the source of the token issuance request, the expiration time of the access token to be issued is, in the issuing, set to expire no later than the expected completion time of the change, wherein in the managing, an address of a current access destination authentication/authorization server with respect to the client is further managed, and an address of the access destination authentication/authorization server after the change with respect to the client for which the access destination authentication/authorization server is to be changed is further managed; and in the managing, with respect to the client for which the access destination authentication/authorization server is to be changed, if the expected completion time of the change has been reached, the address of the access destination authentication/authorization server after the change is further set to the address of the current access destination authentication/authorization server, and the address of the access destination of the authentication/authorization server after the change and the expected completion time of the change are deleted.

2. The authentication/authorization server according to claim 1, wherein in the returning, the address of the current access destination authentication/authorization server with respect to the client that is the source of the token issuance request is returned to the client along with the access token.

3. The authentication/authorization server according to claim 1, wherein in the managing, an address of a current access destination resource server with respect to the client is further managed; and in the returning the address of the current access destination resource server with respect to the client that is the source of the token issuance request is further returned to the client along with the access token.

4. A non-transitory computer-readable medium in which is stored a program that, when executed by an authentication/authorization server that manages access to a resource server, causes the authentication/authorization server to perform:

managing an expected completion time of a change to an access destination authentication/authorization server with respect to a client for which the access destination authentication/authorization server is to be changed;

issuing, in response to a token issuance request from a client, an access token for accessing the resource server, the token having an expiration time; and returning the access token to the client, wherein if an expected completion time of the change to the access destination authentication/authorization server is being managed in the managing with respect to the client that is the source of the token issuance request, the expiration time of the access token to be issued is, in the issuing, set to expire no later than the expected completion time of the change, wherein in the managing, an address of a current access destination authentication/authorization server with respect to the client is further managed, and an address of the access destination authentication/authorization server after the change with respect to the client for which the access destination authentication/authorization server is to be changed is further managed; and in the managing, with respect to the client for which the access destination authentication/authorization server is to be changed, if the expected completion time of the change has been reached, the address of the access destination authentication/authorization server after the change is further set to the address of the current access destination authentication/authorization server, and the address of the access destination of the authentication/authorization server after the change and the expected completion time of the change are deleted.

5. The non-transitory computer-readable medium according to claim 4, wherein in the returning the address of the current access destination authentication/authorization server with respect to the client that is the source of the token issuance request is returned to the client along with the access token.

6. The non-transitory computer-readable medium according to claim 4, wherein in the managing, an address of a current access destination resource server with respect to the client is further managed; and in the returning, the address of the current access destination resource server with respect to the client that is the source of the token issuance request is further returned to the client along with the access token.

7. A service providing system comprising an authentication/authorization server and a client, wherein the authentication/authorization server includes memory storing a first program, and a first processor that executes the first program, and when executing the first program, the first processor causes the authentication/authorization server to perform:

managing an expected completion time of a change to an access destination authentication/authorization server with respect to a client for which the access destination authentication/authorization server is to be changed;

issuing, in response to a token issuance request from a client, an access token for accessing a resource server, the token having an expiration time; and returning the access token to the client, wherein if an expected completion time of the change to the access destination authentication/authorization server is being managed in the managing with respect to the client that is the source of the token issuance request, the expiration time of the access token to be issued is, in the issuing, set to expire no later than the expected completion time of the change, wherein in the managing, an address of a current access destination authentication/authorization server with respect to the client is further managed, and an address of the access destination authentication/authorization server after the change with respect to the client for which the access destination authentication/authorization server is to be changed is further managed; and in the managing, with respect to the client for which the access destination authentication/authorization server is to be changed, if the expected completion time of the change has been reached, the address of the access destination authentication/authorization server after the change is further set to the address of the current access destination authentication/authorization server, and the address of the access destination of the authentication/authorization server after the change and the expected completion time of the change are deleted; and wherein the client is a client including memory storing a second program and a second processor that executes the second program, and when executing the second program, the second processor causes the client to perform:

sending a request for an access token for accessing a resource server to the authentication/authorization server;

when an address of an access destination authentication/authorization server received from the authentication/authorization server as a response to the request for the access token is different from an address of the authentication/authorization server to which the request for the access token was sent, carrying out control so that the request for the access token is sent to the address of the access destination authentication/authorization server received from the authentication/authorization server; and accessing the resource server using the access token received from the authentication/authorization server.

8. An access management method for an authentication/authorization server to manage access to a resource server, the method comprising:

managing an expected completion time of a change to an access destination authentication/authorization server with respect to a client for which the access destination authentication/authorization server is to be changed;

issuing, in response to a token issuance request from a client, an access token for accessing the resource server, the token having an expiration time; and returning the access token to the client, wherein if an expected completion time of the change to the access destination authentication/authorization server is being managed with respect to the client that is the source of the token issuance request, the expiration time of the access token to be issued is, in the issuing, set to expire no later than the expected completion time of the change, wherein in the managing, an address of a current access destination authentication/authorization server with respect to the client is further managed, and an address of the access destination authentication/authorization server after the change with respect to the client for which the access destination authentication/authorization server is to be changed is further managed; and in the managing, with respect to the client for which the access destination authentication/authorization server is to be changed, if the expected completion time of the change has been reached, the address of the access destination authentication/authorization server after the change is further set to the address of the current access destination authentication/authorization server, and the address of the access destination of the authentication/authorization server after the change and the expected completion time of the change are deleted.

9. The access management method according to claim 8, wherein in the returning, the address of the current access destination authentication/authorization server with respect to the client that is the source of the token issuance request is returned to the client along with the access token.

10. The access management method according to claim 8, wherein in the managing, an address of a current access destination resource server with respect to the client is further managed; and in the returning, the address of the current access destination resource server with respect to the client that is the source of the token issuance request is further returned to the client along with the access token.

* * * * *